United States Patent [19]

Peter et al.

[11] 4,213,335
[45] Jul. 22, 1980

[54] FLOW RATE METER WITH TEMPERATURE DEPENDENT RESISTOR

[75] Inventors: Cornelius Peter, Stuttgart; Bernd Kraus, Gerlingen, both of Fed. Rep. of Germany

[73] Assignee: Robert Bosch GmbH, Stuttgart, Fed. Rep. of Germany

[21] Appl. No.: 913,138

[22] Filed: Jun. 6, 1978

[30] Foreign Application Priority Data

Jun. 22, 1977 [DE] Fed. Rep. of Germany ....... 2728060

[51] Int. Cl.³ .............................................. G01F 1/68
[52] U.S. Cl. .................................................... 73/204
[58] Field of Search ................... 73/204, 27 R; 338/28

[56] References Cited

U.S. PATENT DOCUMENTS

| | | | |
|---|---|---|---|
| 1,751,715 | 3/1930 | Peters | 73/204 |
| 2,870,305 | 1/1959 | Ling | 73/204 X |
| 3,498,127 | 3/1970 | Richards | 73/204 |
| 3,888,110 | 6/1975 | Clark | 73/27 |
| 3,900,819 | 8/1975 | Djorup | 73/204 |
| 3,991,624 | 11/1976 | Davies | 73/204 |

FOREIGN PATENT DOCUMENTS

| | | | |
|---|---|---|---|
| 743788 | 5/1973 | Fed. Rep. of Germany | 73/204 |
| 371437 | 5/1973 | U.S.S.R. | 73/204 |
| 373536 | 6/1973 | U.S.S.R. | 73/204 |

*Primary Examiner*—Herbert Goldstein
*Attorney, Agent, or Firm*—Edwin E. Greigg

[57] ABSTRACT

A flow rate meter for measuring the flow rate of a fluid medium, especially that of the air aspirated by an internal combustion engine. A hot wire or film is placed in the air stream and is made part of an electrical circuit powered by the output of a differential amplifier. The voltage drop across the resistor is monitored at the input of the differential amplifier where it is compared with fixed or compensated values. In order to reduce the effect that airborne particles, which are deposited on the hot wire or film, have on the measuring characteristics of the apparatus, the wire or film are shaped so that their leading edge constitutes an area much smaller than the surfaces which are substantially parallel to the stream lines.

4 Claims, 9 Drawing Figures

FLOW RATE METER WITH TEMPERATURE DEPENDENT RESISTOR

BACKGROUND OF THE INVENTION

The invention relates to flow rate meters. More particularly the invention relates to a flow rate meter for measuring the rate of flow of a gas, especially the inducted air for an internal combustion engine. The invention especially relates to an air flow rate meter including a temperature-dependent resistance which is exposed to the air flow and which may be heated. In known hot wire or hot film air flow rate meters, sometimes called anemometers, the measuring wire or a film is subjected to soiling due to airborne particles which causes a fairly rapid change in the measuring characteristics resulting in an erroneous measured signal. Furthermore, a hot film sensor has relatively poor thermal characteristics due to the thermal inertia of the carrier on which the film is placed.

OBJECT AND SUMMARY OF THE INVENTION

It is thus a principal object of the present invention to provide an air flow rate meter which employs a temperature-dependent resistive element that is not subject to substantial soiling and which is thus able to maintain a long-term constancy of its measuring characteristics.

It is a further object of the present invention to provide a hot film air flow rate meter which is not subject to the substantial thermal inertia of the carrier on which the film is placed.

The first of these objects is attained by providing a temperature-sensitive element whose geometry is such that the surfaces opposing the air flow are small in area when compared to the surfaces lying substantially in the direction of flow.

The second of these objects is attained by providing a secondary resistive film with a constant coefficient of resistivity on the same carrier which holds the temperature-dependent resistor.

The invention will be better understood as well as further objects and advantages thereof become more apparent from the ensuing detailed description of preferred embodiments taken in conjunction with the drawing.

DESCRIPTION OF THE PREFERRED EMBODIMENTS

Figure 1:
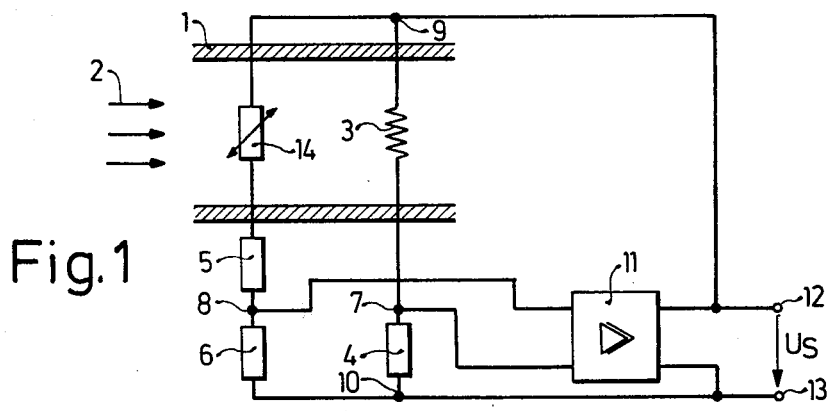
FIG. 1 is a schematic diagram illustrating the principle of the invention.

Turning now to FIG. 1, there will be seen an induction tube 1 belonging to the intake manifold of an internal combustion engine, not shown, through which air flows in the direction of the arrows 2. The induction tube 1 includes a temperature-dependent resistor 3, for example a hot wire or a hot film, which carries an electrical current of controlled magnitude and which supplies the actual value signal for the controller. The controller holds the temperature of the resistor 3 at a level somewhat above the average air temperature. If the air flow rate increases, i.e. the velocity of the flowing air increases, the temperature of the resistor 3 tends to drop. This drop in temperature results in a change of resistance and hence a change in the voltage drop across the resistor which is sensed at the input of the controller, which thereby changes its output current until the predetermined temperature of the resistor 3 is attained again. Thus the controller, embodied schematically by a differential amplifier 11, continuously attempts to hold the temperature of the resistor 3 at a constant temperature in spite of fluctuations in the air flow rate, so that its output current at the same time may be used in a regulating device to show the prevailing air flow rate. The measuring resistor 3, which is temperature-dependent, may be connected in series with a fixed resistor 4 in a first arm of a measuring bridge which has a second arm consisting of series connected resistors 5 and 6. The two arms of the bridge are connected in parallel at junctions 9 and 10. At the point 8 a reference voltage is taken to one input of a differential amplifier 11 while the voltage at the point 7 between the measuring resistor 3 and the resistor 4 is taken to the second input of the differential amplifier 11. The points 9 and 10 are connected across the outputs of the differential amplifier and are thus supplied with operating current. The output voltage of the differential amplifier, designated $U_S$, may be used externally at contacts 12 and 13 for purposes of providing an input signal to fuel management systems and the like. In particular, the signal $U_S$ may be used to control the amount of fuel supplied to the engine for the prevailing air flow rate in a known but unillustrated fuel metering system. The current flowing through the temperature-dependent resistor 3 heats this resistor until the input voltage to the differential amplifier equals the voltage at the other input or some different, predetermined voltage. The output of the amplifier is thus a controlled current flowing into the bridge circuit. If the air flow rate changes, the temperature of the resistor 3 also changes, as does its resistance, which causes a change in the voltage difference between the points 7 and 8, causing the amplifier 11 to correct the output current supplied to the points 9 and 10 until such time as the bridge is balanced or has reached a predetermined degree of imbalance. Accordingly, the output voltage $U_S$, as well as the current through the resistor 3, constitute a measure for the prevailing air flow rate.

In order to compensate for the influence of temperature of the aspirated air on the measured result, it may be suitable to supply a second temperature-dependent compensating resistor 14 in the second arm of the bridge. The magnitude of the resistances of the resistors 5, 6 and 14 should be so chosen that the power loss due to the current flowing through the second temperature-dependent resistor 14 is so low that its temperature is unaffected by changes of the bridge voltage but always corresponds substantially to the temperature of the air flowing around it.

Figure 2:
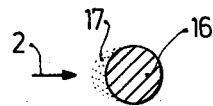
FIG. 2 is a cross section through a resistive wire in the apparatus of the invention.

FIG. 2 illustrates a commonly used hot wire resistor 3 in cross section. The cross section will be seen to be a circle 16 on the leading side of which there occurs a relatively rapid and substantial deposit 17 of particles from airborne contaminations. The surfaces which are downstream of the air flow however remain free of deposits as do the sides substantially parallel to the flow. These deposits 17 change the characteristics of the resistor relatively rapidly, thereby inviting erroneous measurements.

Figure 3:
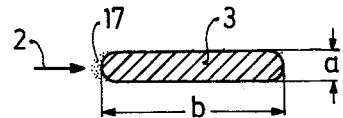
FIGS. 3 to 6 are illustrations of different variants of the cross-sectional configuration of the measuring resistor of the invention.
Figure 4:
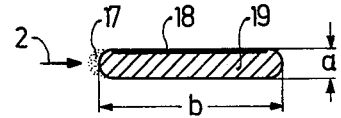

In order to overcome this difficulty, the invention provides, as illustrated for example in FIG. 3, that the leading surfaces, i.e. the surfaces directly exposed to the air flow 2, are relatively small compared with the surfaces parallel to, or downstream of, the air flow. In particular, the invention provides that the hot wire resistor 3 is in the form of a flat strip having a flattened or oblate cross section substantially as shown, with a frontal dimension or height a substantially less than the dimension or width b parallel to the air flow. Accordingly, any accumulation of deposits 17 will be limited to the relatively small leading surface and will not substantially affect the accuracy of the measurements, even after prolonged use. A similar disposition may be used in a flow rate meter which employs a hot film, as illustrated in FIG. 4. In this device, the hot film 18 is applied to a flattened carrier 19 in which the frontal dimension a is again relatively small compared to the dimension b. Accordingly, the deposit of particles occurs only in areas of the carrier on which no hot film exists, thereby eliminating the possibility of alterations of measurements due to particle deposits.

Figure 5:
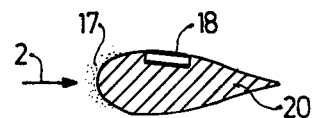

FIG. 5 illustrates an embodiment of a hot film anemometer in which the carrier has a tear drop or airfoil shape 20 in which, according to the invention, it is provided that the hot film 18 be applied substantially parallel to the air flow, as shown, in an area of the carrier which is unaffected by particle deposits.

Figure 6:
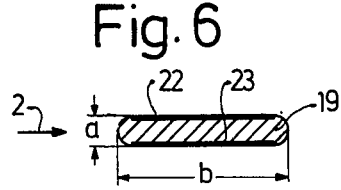

The dynamic characteristic of measuring sensors with a hot film is generally determined by the thermal inertia of the carrier itself, while the actual hot film has essentially zero thermal inertia, i.e. it follows temperature changes virtually without delay. In order to improve the thermal behavior of hot film flow rate sensors, it is thus proposed, according to the present invention, to heat the carrier to the temperature of the hot film, thereby eliminating any effect of the thermal characteristics of the carrier on the measured result. For example, as illustrated in FIG. 6, both of the surfaces of the carrier 19 which are parallel to the air flow are provided with respective hot films 22 and 23. The films 22 and 23 may be connected in parallel electrically as illustrated in FIG. 7, or they may be connected in series as illustrated in FIG. 8.

Figure 7:
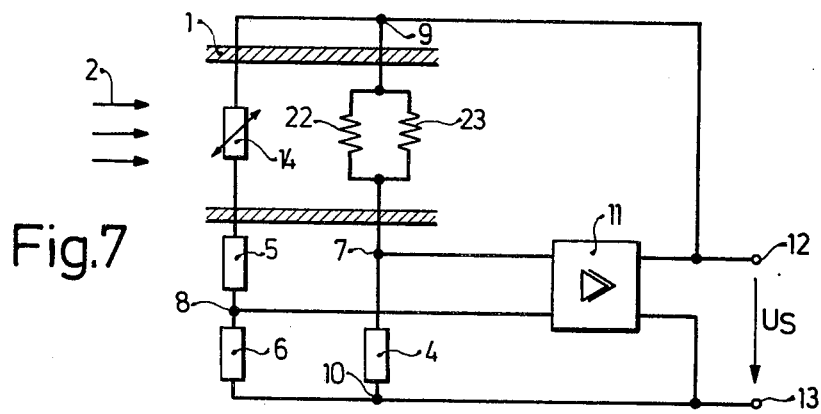
FIG. 7 is a circuit diagram for a hot film flow rate meter according to the invention.
Figure 8:
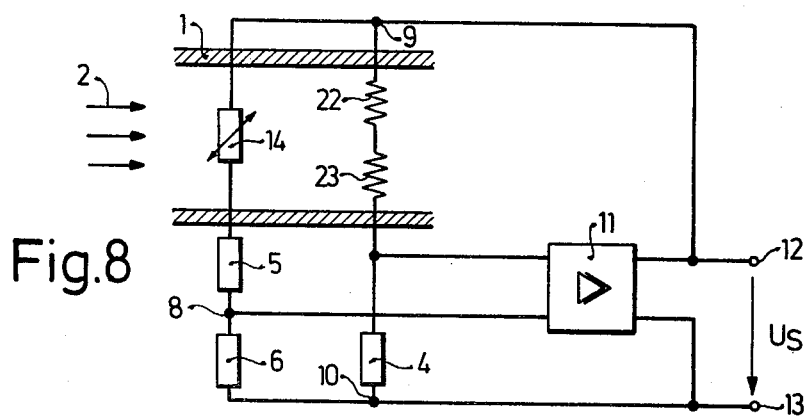
FIG. 8 is a circuit diagram of a variant of the hot film flow rate meter of the invention.

The function of the remaining elements of the apparatus illustrated in FIGS. 7 and 8 is identical to that of the apparatus of FIG. 1.

Figure 9:
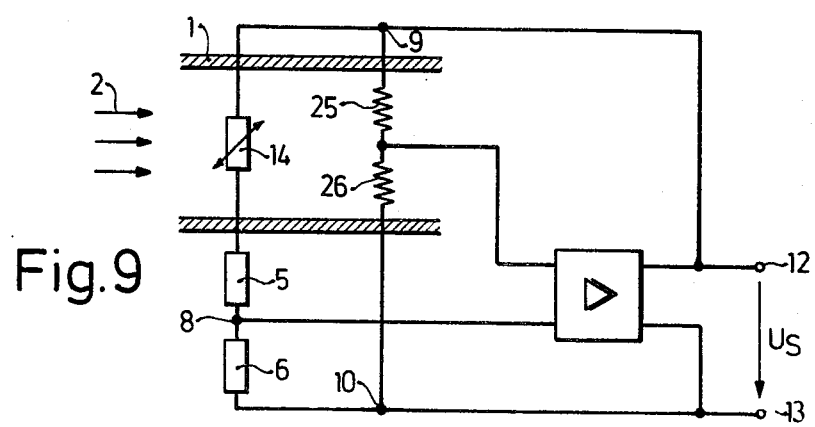
FIG. 9 is a circuit diagram of a second variant of the hot film flow rate meter according to the invention.

It may also be suitable, in yet another variant of the invention, to apply two resistive films to opposing parallel sides of the carrier 19, substantially as was shown in FIG. 6 but to make one of these films a hot film made for example of nickel, while the opposing parallel film is made of a material having a constant resistance. At the operating temperature, both films are to have substantially the same resistance so that no temperature gradient exists across the carrier. In such a device, the hot film 25 and the film 26 made of the material of constant resistance are suitably connected in series with their junction used as the input to the differential amplifier, as illustrated in FIG. 9.

The foregoing relates to preferred exemplary embodiments of the invention, it being understood that other embodiments and variants thereof are possible within the spirit and scope of the invention.

What is claimed and desired to be secured by Letters Patent of the United States is:

1. In a flow rate meter for measuring the rate of flow of induced air flowing in one direction in the induction tube of an internal combustion engine which includes:
a temperature-dependent resistor, disposed in said induced air and connected to receive electrical current;
circuit means, connected to said resistor for providing said electrical current thereto and for measuring the resistance thereof, the improvement comprising:
said temperature-dependent resistor being configured in the form of a flat strip extending in a direction substantially transverse to said one flow direction of said induced air whereby said electrical current flows through said resistor in said substantially transverse direction, said strip having a cross-sectional shape to provide an arcuate leading surface which extends substantially transverse to said one flow direction and wherein the height of said arcuate leading surface is substantially smaller than the width of said strip extending substantially in said one flow direction.

2. A flow rate meter as defined by claim 1, wherein the temperature-dependent resistor is shaped so that its cross section in a plane extending substantially in said one flow direction is flattened, having long sides extending substantially in said one flow direction and short sides extending substantially transverse to said one flow direction.

3. A flow rate meter as defined by claim 1, further comprising a fixed resistor connected in series with said temperature-dependent resistor and constituting together therewith one arm of an electrical measuring bridge, and further comprising at least two fixed resistors connected in series and constituting a second arm of an electrical measuring bridge connected in parallel with said first arm, both of said arms of said measuring bridge being connected to the output connections of a source of power and wherein said source of power is a differential amplifier, one input of which is connected to the junction of said temperature-dependent resistor and said fixed resistor in said first arm of the measuring bridge while the second input of said differential amplifier is connected to the junction of the resistors in the second arm of said measuring bridge.

4. A flow rate meter as defined by claim 3, wherein the second arm of said measuring bridge includes a resistor exposed to the flow of said induced air and connected in series with the remaining resistors in said second arm of said measuring bridge, for eliminating the effects on said measuring bridge of the inherent temperature of the induced air.

* * * * *